No. 607,043. Patented July 12, 1898.
W. H. JAMES.
PNEUMATIC TIRE.
(Application filed Dec. 28, 1897.)
(No Model.)
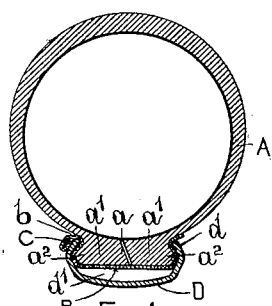
FIG.1.
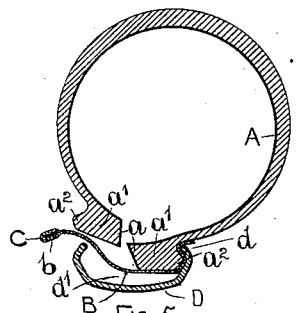
FIG.2.
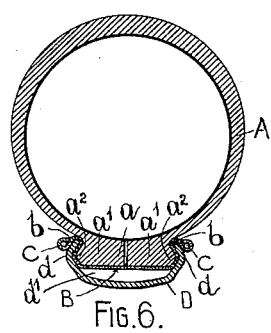
FIG.3.
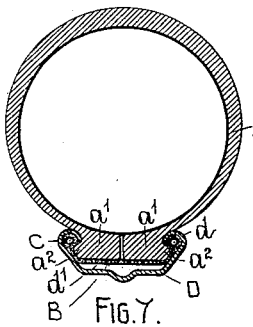
FIG.4.
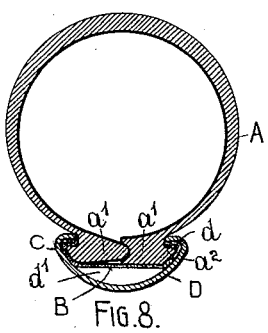
FIG.5.
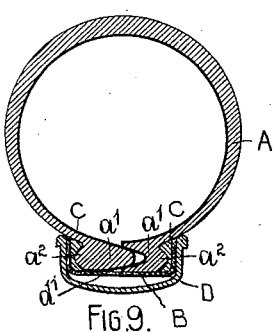
FIG.6.
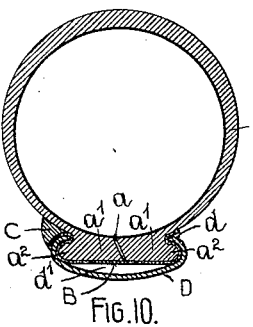
FIG.7.
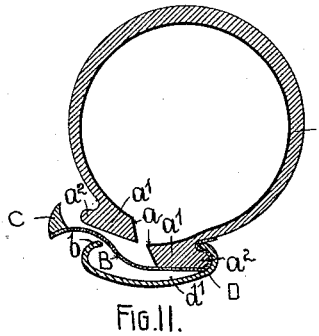
FIG.8.
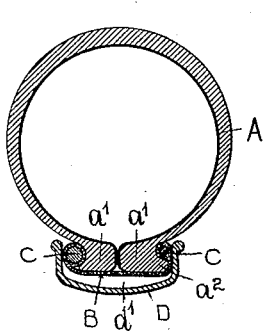
FIG.9.
FIG.10.
FIG.11.
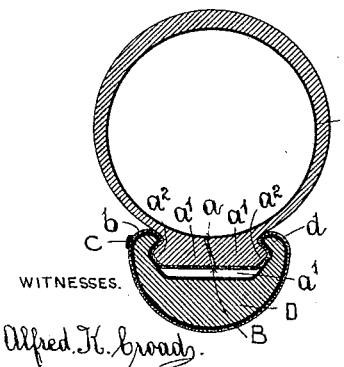
WITNESSES.
Alfred H. Broad.
Albert J. George.
INVENTOR.
William Henry James.
per Robert F. Phillips
Attorney.
THE NORRIS PETERS CO., PHOTO-LITHO., WASHINGTON, D. C.

UNITED STATES PATENT OFFICE.

WILLIAM HENRY JAMES, OF TULSE HILL, ENGLAND.

PNEUMATIC TIRE.

SPECIFICATION forming part of Letters Patent No. 607,043, dated July 12, 1898.

Application filed December 28, 1897. Serial No. 664,112. (No model.) Patented in England March 4, 1897, No. 5,769.

*To all whom it may concern:*

Be it known that I, WILLIAM HENRY JAMES, a subject of the Queen of Great Britain, residing at Tulse Hill, in the county of Surrey, England, have invented a new and useful Improvement in and Relating to Pneumatic Tires, (for which I have obtained a patent in Great Britain, No. 5,769, bearing date March 4, 1897,) of which the following is a full and complete specification.

This invention relates to an improved construction of pneumatic tire of the type generally known as "tubeless" and of a wheel-rim therefor; and it consists of a single tube split or divided circumferentially at its inner side or base, of a wheel-rim for the said tire, and of a band mounted in or engaging with the said rim, forming a diaphragm or false bottom to the groove thereof, the object being to obtain an initial seal or air-tight joint between the divided edges of the split tube in a more reliable and effective manner than at present obtains.

Figure 1 is a view in transverse section of a tire embodying this invention mounted in the wheel-rim. Fig. 2 is a similar view showing one edge of the tire dismounted from the wheel-rim. Fig. 3 is a view in transverse section, showing a modification of the construction shown by Fig. 1. Fig. 4 is a view in transverse section of another form the invention may assume. Figs. 5 and 6 are similar views of modifications of the construction shown by Fig. 4. Fig. 7 is a view in transverse section of a further modification, showing the tire mounted in the wheel-rim. Fig. 8 is a similar view showing the same construction as is shown by Fig. 7, but with one edge of the tire detached from the wheel-rim. Figs. 9, 10, and 11 are views in transverse section, showing further modifications.

The tire consists of a tube A, thickened on its inner side to form a base $a$, which is slit or divided circumferentially, thus forming two enlarged edges $a'$ $a'$, on the outer sides of which are formed ears or lugs $a^2$ $a^2$. The tube is constructed of rubber, reinforced with canvas or other suitable fabric in the well-known manner, the said fabric being cut or arranged on the cross or bias, so that a contractile action is set up on inflation. This tube has its inner surface and also the abutting faces of the enlarged edges $a'$ $a'$ faced or lined with pure rubber or other suitable material to make it air-proof.

The wheel-rim D has its edges $d$ incurved to form grooves or recesses to receive the ears or lugs $a^2$ $a^2$ on the base of the split tube A, and the bottom part of its groove $d'$ preferably has sloping sides, as shown in Figs. 1, 2, 3, 4, 5, 6, 9, and 10, for a purpose that will presently be made clear.

In the groove $d'$ of the wheel-rim is placed a hoop or band B of canvas or other suitable fabric. The edges $b$ of this band are adapted to engage with the edges $d$ of the wheel-rim D, either by having inextensible cores C of a slightly-smaller diameter than the edges of the rim, as shown by Fig. 3, or by means of hooks C' or their equivalents, as shown in Fig. 11, and the width of the band is such that it cannot touch the bottom of the groove in the rim, but forms a diaphragm or false bottom to it.

As an alternative construction one or both of the edges $b$ of the band B may be permanently fixed or attached to the sides of the wheel-rim D, as shown in Fig. 10, or one of the edges of the band may be permanently fixed to one of the edges of the tube A, as shown in Figs. 1, 2, 7, and 8.

As a further modification the edges $b$ of the band may lie within the groove $d'$ of the wheel-rim and engage directly with the ears or lugs $a^2$ on the base of the split tube A, as shown in Figs. 4, 5, 6, and 9, or one of the edges of the band B may be permanently fixed to one side of the base $a$ of the tube A, and the other edge engage with the ear or lug on the other side of the base of the tube, the engagement of the edge or edges of the band with the ears or lugs $a^2$ being effected in a similar manner to their engagement with the edges of the wheel-rim—that is to say, either by means of inextensible cores C or by means of hooks C'.

When one or both of the edges $b$ of the band B are intended to engage with one or both edges of the wheel-rim by reason of their being fitted with inextensible cores, I prefer to shape them so that they engage both with the edge or edges of the rim and also with one or both sides of the tire, as shown in Figs. 7 and 8.

The divided edges a' a' of the split tube may be arranged either to abut one against the other, as shown in Figs. 1, 2, 3, 4, 7, 8, 9, and 10, or to interengage, as shown in Figs. 5 and 6, in order to make the seal of the tube.

A further modification consists in mounting a band or hoop B' of an inverted-wedge shape in cross-section in the center of the band B and in shortening the enlarged edges a' and a' of the tube, so that they engage with the said band or hoop B', as shown in Fig. 11.

The tube A is made of such a size with respect to the band B and wheel-rim D that its base a grips the band B tightly when mounted in the wheel-rim, which grip is intensified on inflation.

I sometimes construct the band B of rubber and fabric, so as to make it air-proof and thus assist in effecting a perfect seal between the divided edges of the split tube.

The action of the tire is as follows: When the tube is mounted in the wheel-rim, its divided edges are pressed into intimate contact, whereby an initial seal or air-tight joint is attained by reason of the sphincter-like grip of the base a of the tube A on the band B, due both to its elasticity and its contractile action. This action is intensified by the use of rims having the bottoms of the grooves of a wedge shape in cross-section, as shown in Figs. 1, 2, 3, 4, 5, 6, 9, and 10.

What I claim as my invention, and desire to secure by Letters Patent, is—

1. In combination, a pneumatic tire, consisting of a single tube having its inner side or base thickened and split or divided circumferentially, the divided edges being arranged to form a seal or air-tight joint when they are in contact, of a wheel-rim adapted to receive the base of the tire and of a band mounted in or fixed to the sides of the wheel-rim so as to form a diaphragm in, or false bottom to, the groove of the rim on which the base of the tire rests, as set forth.

2. In combination, a pneumatic tire, consisting of a single tube having its inner side or base thickened and split or divided circumferentially, the divided edges being arranged to form a seal or air-tight joint when in contact, of a wheel-rim having a groove adapted to receive the base of the tire, and of a band adapted to form a diaphragm in, or false bottom to, the groove of the rim, one edge of the said band being permanently fixed to one edge of the tire and the other edge engaging with one of the edges of the wheel-rim, as set forth.

3. In combination, a pneumatic tire, consisting of a single tube having its inner side or base thickened and split or divided circumferentially, the divided edges being arranged to form a seal or air-tight joint when in contact, of a wheel-rim having a groove adapted to receive the base of the tire, and of a band adapted to form a diaphragm in, or false bottom to, the groove of the rim, one edge of the said band being permanently fixed to one edge of the wheel-rim and the other edge engaging with the other edge of the wheel-rim, as set forth.

4. In combination, a pneumatic tire, consisting of a single tube having its inner side or base thickened and split or divided circumferentially, the divided edges being arranged to form a seal or air-tight joint when in contact, of a wheel-rim having a groove adapted to receive the base of the tire, and of a band adapted to form a diaphragm in, or a false bottom to, the groove of the wheel-rim, the edges of the said band engaging with the sides of the thickened base of the tire, as set forth.

5. In combination, a pneumatic tire, consisting of a single tube having its inner side or base thickened and split or divided circumferentially, the divided edges being arranged to form a seal or air-tight joint when in contact, of a wheel-rim having a groove adapted to receive the base of the tire, and of a band adapted to form a diaphragm in, or a false bottom to, the groove of the wheel-rim, one of the edges of the band being permanently fixed to one edge of the tire and the other edge engaging with the side or outer margin of the other edge of the tire, as set forth.

6. In combination, a pneumatic tire, consisting of a single tube having its inner side or base thickened and split or divided circumferentially, of a wheel-rim having a groove adapted to receive the base of the tire, of a band adapted to form a diaphragm in, or a false bottom to, the groove of the wheel-rim the edges of which engage with or are fixed to the sides of the wheel-rim, and of a band or hoop of an inverted-wedge shape in cross-section with the sides of which the divided edges of the split tube engage, as set forth.

7. A pneumatic tire, consisting of a tube A having its inner side or base a thickened and split or divided circumferentially, the divided edges being adapted to abut or interlock, and of a band or hoop B one edge of which is permanently fixed to one side of the base of the split tube and the other edge of which engages with an exterior ear or lug on the other side of the base of the split tube, as set forth.

8. A pneumatic tire, consisting of a tube A having its inner side or base a thickened and split or divided circumferentially, the divided edges being adapted to abut or interlock, and of a band or hoop B the edges of which engage by means of inextensible cores or hooks with ears or lugs on the sides of the base of the split tube, as set forth.

WILLIAM HENRY JAMES.

Witnesses:
W. M. HARRIS,
FRED C. HARRIS.